(12) United States Patent
Nagy et al.

(10) Patent No.: US 6,373,688 B1
(45) Date of Patent: Apr. 16, 2002

(54) SERVICE ENTRANCE BARRIER INSULATOR

(75) Inventors: Joseph G. Nagy, Southington; Stephen L. Wuest, Middlebury; Michael J. Fraser, Glastonbury; David A. Reid; Javier Larranaga, both of Bristol, all of CT (US)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 09/682,032

(22) Filed: Jul. 12, 2001

(51) Int. Cl.$^7$ ................................................. H02B 1/26
(52) U.S. Cl. ...................... 361/641; 361/664; 361/622; 174/58; 200/50.4
(58) Field of Search ............................ 361/627, 622, 361/638, 641, 649, 651, 650, 657, 656, 664–667, 668; 174/67, 58, 99 B, 37, 63, 50; 200/50.4, 50 C, 5 E, 5 B, 5 C, DIG. 6, 43.01–43.22; 324/156; 73/201; 248/27.1

(56) References Cited

U.S. PATENT DOCUMENTS

| | | | | |
|---|---|---|---|---|
| 3,354,357 A | * | 11/1967 | Jorgensen et al. | ........... 317/119 |
| 4,093,970 A | | 6/1978 | M'Sadoques et al. | |
| 4,435,739 A | * | 3/1984 | Shevik | ........................ 361/346 |
| 4,472,761 A | * | 9/1984 | Koskosky et al. | ........... 361/355 |
| 4,688,146 A | | 8/1987 | Newmark et al. | |
| 4,698,727 A | | 10/1987 | Hibbert et al. | |
| 4,717,987 A | | 1/1988 | Newmark et al. | |
| 4,754,247 A | | 6/1988 | Raymont et al. | |
| 5,301,086 A | * | 4/1994 | Harris et al. | ................. 361/641 |
| 5,393,942 A | * | 2/1995 | Reiner et al. | ............. 200/50 C |
| 5,450,282 A | | 9/1995 | Webber et al. | |
| 5,638,256 A | * | 6/1997 | Leach et al. | ................. 361/641 |
| 5,640,294 A | | 6/1997 | Caggiano et al. | |
| 6,036,542 A | | 3/2000 | Montague et al. | |
| 6,180,897 B1 | | 1/2001 | Montague et al. | |
| 6,252,165 B1 | | 6/2001 | Montague et al. | |
| 6,281,551 B1 | | 8/2001 | Chan et al. | |
| 6,294,835 B1 | | 9/2001 | Dala et al. | |

* cited by examiner

*Primary Examiner*—Darren Schuberg
*Assistant Examiner*—Michael Datskovsky
(74) *Attorney, Agent, or Firm*—Karl Vick, Esq.; Damian Wasserbauer, Esq.; Armstrong Teasdale LLP

(57) ABSTRACT

A service entrance barrier for a load center that includes a housing and a service entrance having at least one branch fed main breaker electrically connected to branch feed lines. The service entrance barrier is securable to the load center housing to prevent human contact with electrically energized parts located in the service entrance of the load center. The service entrance barrier includes a main body portion, at least one mounting leg extending from the main body portion, a protection tab extending from said main body portion, and a non-conductive sleeve encompassing the protection tab.

16 Claims, 4 Drawing Sheets

SERVICE ENTRANCE BARRIER INSULATOR

BACKGROUND OF INVENTION

This invention relates generally to load centers, and more particularly, to a metal service entrance barrier inside the load center to prevent human contact with electrically energized parts within the service entrance.

Electrical clearance requirements specified by regulatory agencies can sometimes conflict with the ability of the service entrance barrier to adequately surround the main breaker in a load center to prevent human contact with electrically energized parts without adding electrical insulation to the barrier. One known solution to this problem is to secure a molded insulation piece to the service entrance barrier. However this solution increases costs, adds an extra part to the load center, and increases manufacturing complexity.

SUMMARY OF INVENTION

In one embodiment of the present invention a service entrance barrier for a load center is provided. The load center includes a housing and a service entrance having at least one branch fed main breaker electrically connected to branch feed lines. The service entrance barrier is securable to the load center housing to prevent human contact with electrically energized parts located in the service entrance of the load center. The service entrance barrier includes a main body portion, at least one mounting leg extending from the main body portion, a protection tab extending from said main body portion, and a non-conductive sleeve encompassing the protection tab.

In another embodiment, a load center is provided. The load center box includes a housing, at least one branch fed main breaker mounted in the housing, a service entrance barrier mounted in the housing and positioned to surround the main breakers to prevent human contact with electrically energized parts located in the service entrance box. The service entrance barrier includes a main body portion with at least one mounting leg extending from the main body portion and secured to the load center box housing. The service entrance barrier also includes a protection tab extending from the main body portion and a self retaining non-conductive sleeve encompassing the protection tab.

In another embodiment, a load center is provided that includes a housing, at least one branch fed main breaker mounted in the housing, a service entrance barrier mounted in the housing and positioned to surround the main breakers to prevent human contact with electrically energized parts located in the service entrance box. The service entrance barrier includes a main body portion with at least one mounting leg extending from the main body portion and secured to the load enter box housing. The service entrance barrier also includes a protection tab extending from the main body portion and a non-conductive heat-shrink tubing sleeve encompassing the protection tab.

In a further embodiment, a service entrance barrier for a load center is provided. The load center includes a housing and a service entrance having at least one branch fed main breaker electrically connected to branch feed lines. The service entrance barrier is securable to the load center housing to prevent human contact with electrically energized parts located in the service entrance of the load center. The service entrance barrier includes a main body portion, at least one mounting leg extending from the main body portion, a protection tab extending from said main body portion, and a non-conductive heat-shrink tubing sleeve encompassing the protection tab.

In still another embodiment, a method of preventing human contact with electrically energized parts in a load center is provided. The load center includes a housing and at least one branch fed main breaker mounted in the housing and electrically connected to branch feed lines. The method includes providing a service entrance barrier plate that includes a main body portion, at least one mounting leg extending from the main body portion, and a protection tab extending from the main body portion. The method further includes slipping a length of non-conductive heat-shrink tubing onto the protection tab, and heating the heat-shrink tubing to firmly attach the tubing to the protection tab.

DETAILED DESCRIPTION

Figure 1:
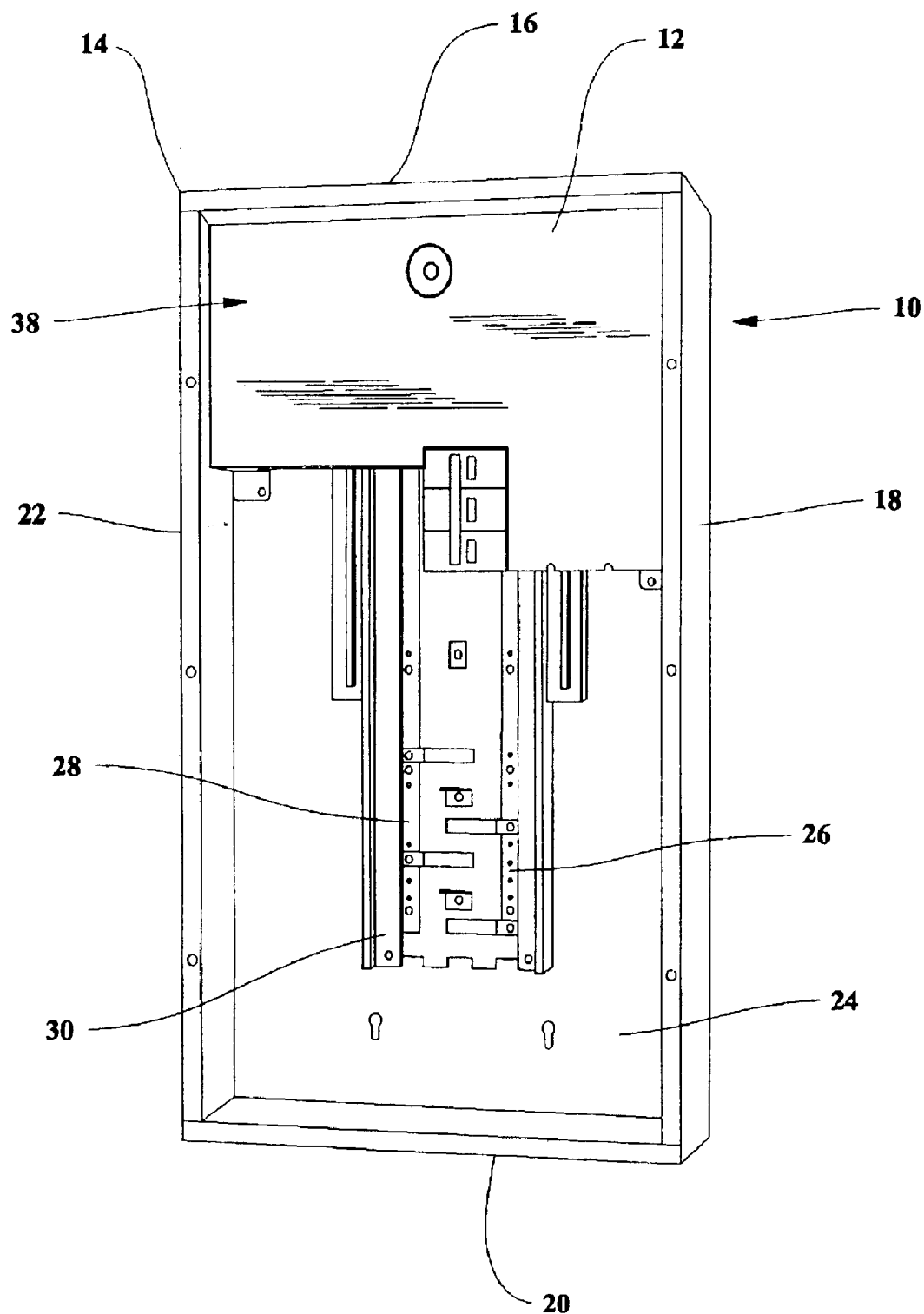
FIG. 1 is front view of a load center including a service entrance barrier in accordance with an embodiment of the present invention.
Figure 2:
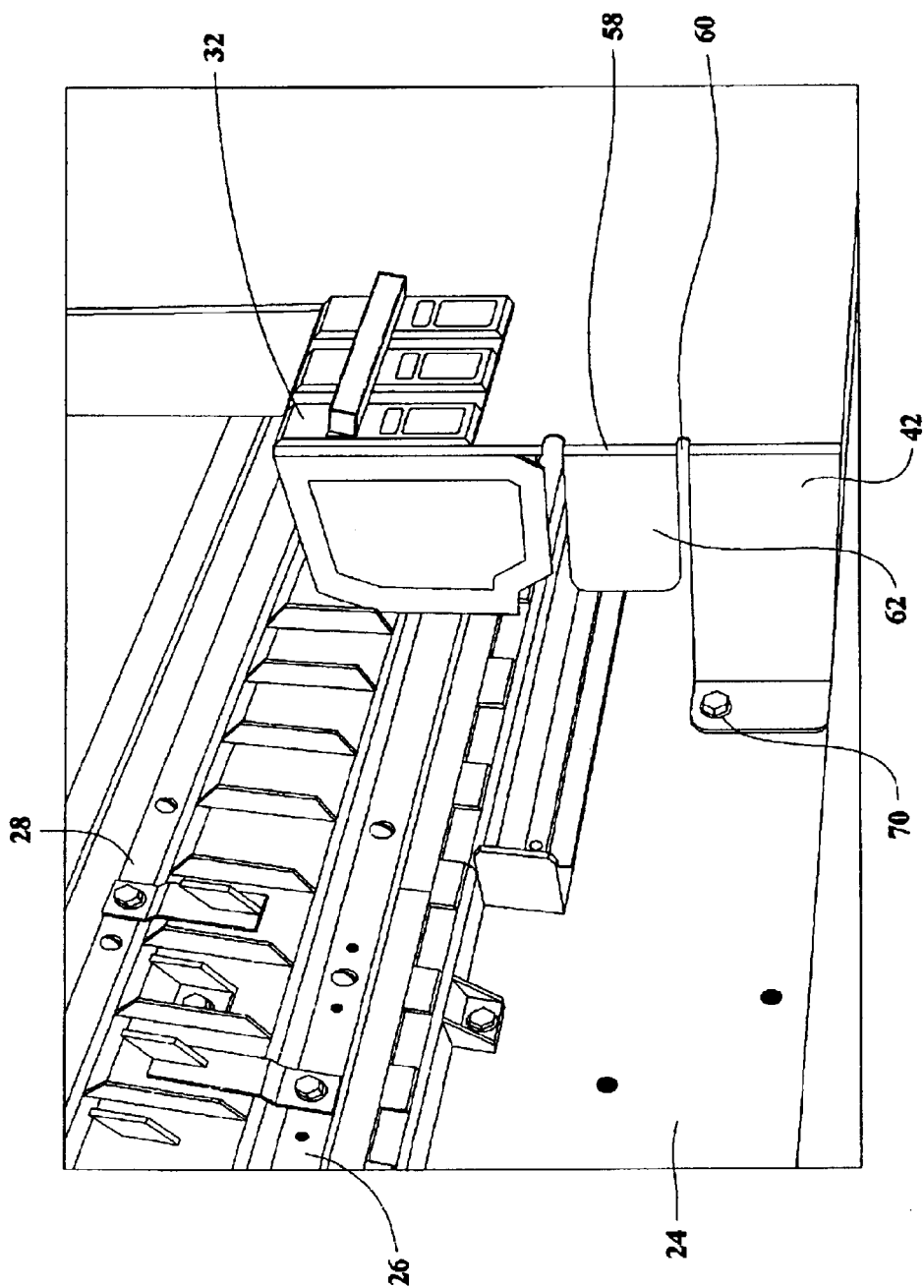
FIG. 2 is a perspective view of a portion of the load center shown in FIG. 1.

FIG. 1 is front view of a load center 10 that includes a service entrance barrier 12 in accordance with an embodiment of the present invention, and FIG. 2 is a perspective view of a portion of load center 10. Referring to FIGS. 1 and 2, in one exemplary embodiment, load center 10 includes a housing 14 having a box shape with four sides 16, 18, 20, and 22, and a bottom 24. In an alternate embodiment, housing 14 also includes a cover (not shown). Mounted to housing bottom 24 are parallel bus bars 26 and 28. An insulation barrier block 30 is located between bus bars 26 and 28 and housing bottom 24 to electrically insulate bus bars 26 and 28 from housing 14. Bus bars 26 and 28 are electrically coupled to main circuit breaker 32, which is connected to branch feed lines (not shown).

Service entrance barrier 12 is mounted to housing 14 and surrounds main breaker 32. Service entrance barrier 12 in combination with housing 14 defines a service entrance box 38 where the branch feed lines enter load center 10 and connect to main circuit breaker 32.

Figure 5:
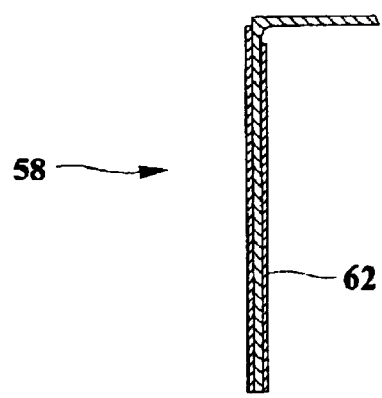
FIG. 5 is a cross sectional view of service the entrance barrier shown in FIG. 4 through line A—A.
Figure 3:
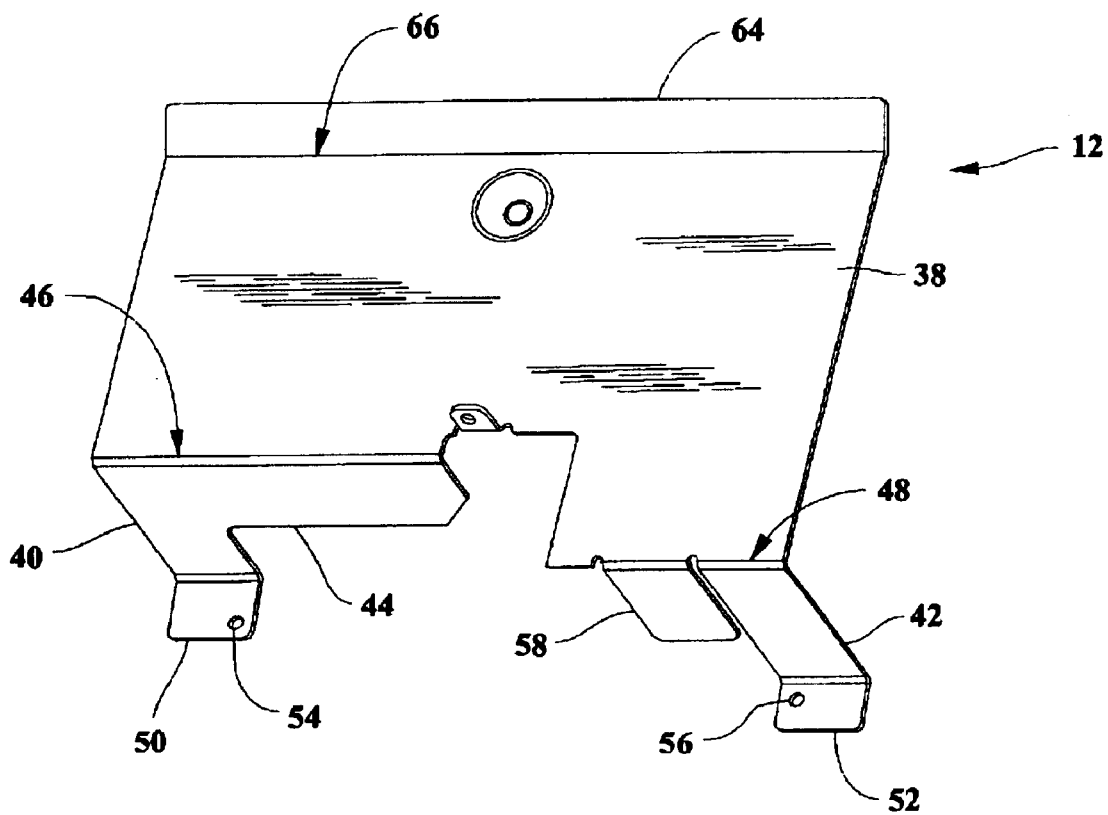
FIG. 3 is a perspective view of the service entrance barrier shown in FIG. 1.
Figure 4:
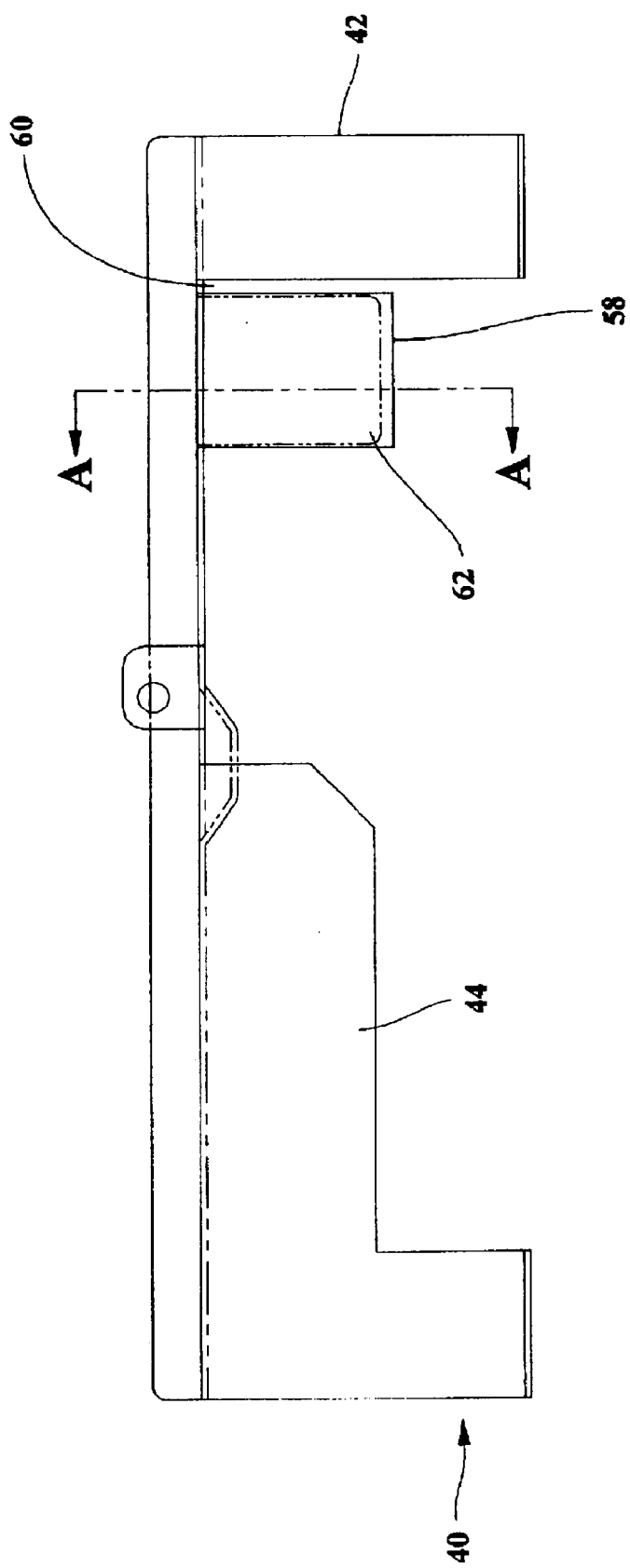
FIG. 4 is a side view of the service entrance barrier shown in FIG. 1.

Referring also to FIGS. 3, 4 and 5, service entrance barrier 12 includes a main body portion 38 and mounting legs 40 and 42 extending from main body portion 38. An upper portion of mounting leg 40 includes a protection flange 44 extending along a side edge 46 of main body portion 38. Mounting leg 40 and protection flange 44 extend from side edge 46 at approximately a right angle. Mounting leg 42 extends at approximately a right angle from side edge 48 of main body portion 38. Mounting legs 40 and 42 include attachment portions 50 and 52 respectively. Fastener openings 54 and 56 extend through attachment portions 50 and 52 respectively.

A protection tab 58 extends at approximately a right angle from side edge 48 of main body portion 38. Protection tab 58 is located adjacent to and parallel to mounting leg 42. A gap 60 is located between protection tab 58 and mounting leg 42. A non-conductive insulation sleeve 62 encompasses protection tab 58 to electrically insulate protection tab 58. Non-conductive sleeve 62 is self retaining and in one embodiment, insulation sleeve 62 is a length of heat-shrink tubing. To attach the heat-shrink tubing to protection tab 58, the heat-shrink tubing is slipped over protection tab 58 and then heated to a predetermined temperature to shrink the tubing and form fit the heat-shrink tubing to protection tab 58. Gap 60 is sized to permit the heat-shrink tubing to slip over protection tab 58. The heat-shrink tubing is held in place by friction between the tubing and protection tab 58 generated by the form fit of the heat shrunk tubing.

Service entrance barrier 12 also includes a lip 64 extending from a side edge 66 of main body portion 38. Lip 64 is positioned adjacent side 16 of housing 14 to secure service entrance barrier 12 to housing 14. Also, fastener openings 54 and 56 are sized to receive fasteners 70 to attach service entrance barrier 12 to housing 14.

The above described load center 10 with service entrance barrier 12 meets regulatory body code specifications for electrical clearances between electrically energized parts and grounded metal and code specifications concerning finger access to electrically energized parts. The use of heat-shrink tubing for insulation sleeve 62 provides for low part cost while maintaining a highly reliable insulation design that meets code specifications for insulation and human safety.

While the invention has been described in terms of various specific embodiments, those skilled in the art will recognize that the invention can be practiced with modification within the spirit and scope of the claims.

What is claimed is:

1. A service entrance barrier for a load center, said load center comprising a housing and a service entrance having at least one branch fed main breaker electrically connected to branch feed lines, said barrier securable to the load center housing to prevent human contact with electrically energized parts located in the service entrance, said barrier comprising:
   a main body portion;
   at least one mounting leg extending from said main body portion, each said mounting leg securable to the load center housing;
   a tab extending from said main body portion; and
   a non-conductive sleeve encompassing said tab.

2. A barrier in accordance with claim 1 wherein said non-conductive sleeve comprises heat-shrink tubing.

3. A load center comprising:
   a housing;
   at least one branch fed main breaker mounted in said housing;
   a service entrance barrier mounted in said housing and positioned to surround said at least one breaker to prevent human contact with electrically energized parts located in said load center, said barrier comprising:
   a main body portion;
   at least one mounting leg extending from said main body portion, each said mounting leg secured to said housing;
   a tab extending from said main body portion; and
   a self retaining non-conductive sleeve encompassing said tab.

4. A load center in accordance with claim 3 wherein said non-conductive sleeve comprises heat-shrink tubing.

5. A load center in accordance with claim 4 wherein said sleeve encompassed tab is positioned adjacent an electrical connection between said at least one breaker and at least one branch feed line.

6. A load center in accordance with claim 3 wherein said barrier further comprises a lip extending from a side edge of said main body portion.

7. A load center in accordance with claim 3 wherein each said mounting leg comprises a fastener opening sized to receive a fastener.

8. A load center comprising:
   a housing;
   at least one branch fed main breaker mounted in said housing;
   a service entrance barrier mounted in said housing and positioned to surround said at least one main breaker to prevent human contact with electrically
   energized parts located in said load center, said barrier comprising:
   a main body portion;
   at least one mounting leg extending from said main body portion, each said mounting leg secured to said service entrance box housing;
   a tab extending from said main body portion; and
   a non-conductive sleeve encompassing said tab, said non-conductive sleeve comprising heat-shrink tubing.

9. A load center in accordance with claim 8 wherein said sleeve encompassed tab is positioned adjacent an electrical connection between said at least one main breaker and at least one branch feed line.

10. A load center in accordance with claim 8 wherein said barrier further comprises a lip extending from a side edge of said main body portion.

11. A load center in accordance with claim 8 wherein each said mounting leg comprises a fastener opening sized to receive a fastener.

12. A service entrance barrier for a load center box, said load center box comprising a housing and at least one branch fed main breaker electrically connected to branch feed lines, said barrier securable to the load center box housing to prevent human contact with electrically energized parts located in the load center box, said service entrance barrier comprising:
   a main body portion;
   at least one mounting leg extending from said main body portion, each said mounting leg securable to the load center box housing;

a tab extending from said main body portion; and a non-conductive heat-shrink tubing sleeve encompassing said tab.

13. A method of preventing human contact with electrically energized parts in a load center, the load center comprising a housing and at least one branch fed main breaker mounted in the housing and electrically connected to branch feed lines, said method comprising:

providing a service entrance barrier plate comprising a main body portion, at least one mounting leg extending from the main body portion, and a tab extending from said main body portion;

positioning a length of non-conductive heat-shrink tubing onto the tab; and heating the heat-shrink tubing to attach the tubing to the tab.

14. A method in accordance with claim 13 further comprising positioning the service entrance barrier adjacent a connection between the at least one main breaker and the branch feed lines.

15. A method in accordance with claim 14 further comprising securing each mounting leg to the load center housing.

16. A method in accordance with claim 14 wherein positioning the barrier adjacent a connection between the at least one main breaker and the branch feed lines comprises positioning the barrier so that the tab is adjacent the connection between the at least one main breaker and the branch feed lines.

* * * * *